US008354145B2

(12) United States Patent
De Rydt et al.

(10) Patent No.: US 8,354,145 B2
(45) Date of Patent: Jan. 15, 2013

(54) METHOD OF APPLYING A PATTERN TO A SUBSTRATE

(75) Inventors: Tim Els Leo De Rydt, Kapellen (BE); Laurent Goubet, Varambon (FR)

(73) Assignee: Akzo Nobel Coatings International B.V., Arnhem (NL)

( * ) Notice: Subject to any disclaimer, the term of this patent is extended or adjusted under 35 U.S.C. 154(b) by 738 days.

(21) Appl. No.: 12/293,507

(22) PCT Filed: Mar. 20, 2007

(86) PCT No.: PCT/EP2007/052611

§ 371 (c)(1),
(2), (4) Date: Sep. 18, 2008

(87) PCT Pub. No.: WO2007/107549

PCT Pub. Date: Sep. 27, 2007

(65) Prior Publication Data

US 2009/0280307 A1 Nov. 12, 2009

Related U.S. Application Data

(60) Provisional application No. 60/791,441, filed on Apr. 13, 2006.

(30) Foreign Application Priority Data

Mar. 21, 2006 (EP) .................................... 06111499

(51) Int. Cl.
*B32B 3/00* (2006.01)

(52) U.S. Cl. ....................................... 427/550; 427/598

(58) Field of Classification Search .................. 427/598, 427/547, 550

See application file for complete search history.

(56) References Cited

U.S. PATENT DOCUMENTS

| | | | | |
|---|---|---|---|---|
| 3,791,864 | A | 2/1974 | Steingroever | |
| 6,482,510 | B1 | 11/2002 | Rajan et al. | |
| 2002/0182383 | A1 | 12/2002 | Phillips et al. | |
| 2003/0022370 | A1* | 1/2003 | Casagrande et al. | 435/372.1 |
| 2003/0165637 | A1 | 9/2003 | Phillips et al. | |
| 2004/0241394 | A1* | 12/2004 | Burrows | 428/195.1 |

FOREIGN PATENT DOCUMENTS

| | | |
|---|---|---|
| DE | 2 006 848 | 9/1971 |
| DE | 2 010 831 | 9/1971 |
| EP | 0 556 449 | 8/1993 |
| EP | 0 686 675 | 12/1995 |
| FR | 2 113 650 | 2/1974 |
| RU | 2031802 | 3/1995 |
| WO | 00/39397 | 7/2000 |
| WO | 02/090002 | 11/2002 |

OTHER PUBLICATIONS

International Search Report, PCT International Application No. PCT/EP2007/052611, dated May 30, 2007.

Written Opinion of the International Searching Authority and International Preliminary Report on Patentability, PCT International Application No. PCT/EP2007/052611, dated May 8, 2007.

Search Report, European Patent Application No. EP 06 11 1499, dated Jul. 26, 2006.

Reply to Written Opinion of the International Searching Authority for PCT International Application No. PCT/EP2007/052611, dated Jan. 15, 2008.

* cited by examiner

*Primary Examiner* — Michael Cleveland
*Assistant Examiner* — Tabassom Tadayyon Eslami
(74) *Attorney, Agent, or Firm* — Kenyon & Kenyon LLP

(57) ABSTRACT

Method for applying a pattern onto a substrate, the method including the following steps: applying a layer of a paint comprising magnetically orientable pigments on the substrate; exposing the paint to a magnetic field, whereby the pigments are oriented along field lines of the magnetic field to produce a pattern in the paint layer; and solidifying the paint on the substrate; characterized in that the magnetic field is generated by a magnetic part embedded in the substrate.

7 Claims, No Drawings

METHOD OF APPLYING A PATTERN TO A SUBSTRATE

REFERENCE TO RELATED APPLICATION(s)

This application is the U.S. National Phase of PCT/EP2007/052611 filed on Mar. 20, 2007 and claims the benefit of U.S. Provisional Application No. 60/791,441 filed on Apr. 13, 2006.

The present invention relates to a method of applying a pattern to a substrate using a paint comprising magnetically orientable pigments. It also relates to products provided with a pattern by such a method.

EP 556 449 discloses a method of decorating a substrate with a paint containing magnetically orientable flake pigments which form a pattern with optical depth under the influence of a magnetic field of a magnet which has a contour corresponding to the desired pattern. The magnet has to stay in place until the paint film has dried. During solidification of the paint film, the magnet is not allowed to move.

FR 2113650 discloses a method for decorating substrates with magnetically orientable flake pigments where the magnetic field outlining the desired pattern on the substrate is a primer layer containing permanent magnetic particles. Only relatively weak magnetic fields can be generated by the thin primer layer. Using such weak magnetic fields, it is difficult to obtain patterns with optical depth.

WO 02/090002 discloses a similar method wherein the magnetic field is provided by a magnetic print on the substrate to be painted. Such a method is particularly suitable for documents or bank notes but less suitable for shaped substrates, such as plastic parts.

The object of the invention is to find a way to improve the quality of the decorative patterns on plastic substrates, in particular to improve the appearance of sharp lines. A further object is to reduce the time required to carry out the process.

The object of the invention is achieved by a method for decorating a plastic substrate by the following steps:

- applying a layer of a paint comprising magnetically orientable pigments on the substrate;
- exposing the freshly applied, not yet solidified paint to a magnetic field, whereby the pigments are oriented along field lines of the magnetic field to produce a pattern in the paint layer; and
- solidifying the paint on the substrate;

characterized in that the magnetic field is generated by at least one magnetic part embedded in the plastic substrate to be coated, e.g., moulded into the plastic substrate.

In a first embodiment the magnetic part embedded in the substrate is a permanent magnet having an outline corresponding to the desired pattern.

The magnet can be embedded in the substrate by placing it in a mould and moulding the plastic around it, e.g., by injection moulding, reaction injection moulding, slush or rotomoulding, dip moulding, sheet moulding, blow moulding, extrusion, pultrusion, or any other suitable production method. The smaller the distance between the magnet and the surface of the substrate to be coated, the clearer the details of the pattern are. The smaller the distance between the embedded magnet and the substrate surface, the sharper details are shown. To have a workable distance combined with sharp details, the magnet can, e.g., be embedded about 1-1.5 mm beneath the surface of the substrate.

In an alternative embodiment, the magnetic part in the substrate is formed by a part of the substrate comprising dispersed magnetic or magnetizable particles which have been magnetized to generate the desired magnetic field. This results in more homogeneous mechanical and physical properties.

The magnetic particles can for instance be dispersed in the substrate by mixing them with the raw material before moulding and subsequently moulding the mixture. Subsequently, the particles can be magnetized in such a way that they generate the desired magnetic field.

After the solidification of the paint layer the magnetic part of the plastic substrate can be de-magnetized, if so desired. This can for example be done by using a similar magnetic force after curing or drying of the paint. This process will not affect the appearance of the pattern in the paint layer, but will decrease or eliminate the magnetic field in the end product.

The magnetic particles dispersed in the substrate can for example be ferrite particles, such as barium ferrite or strontium ferrite, alloys of rare earth metals, such as samarium cobalt alloys, chromium dioxide, bismuth manganese, neodymium or similar magnetic materials. Typically, the particle size of the magnetic particles can range from about 10 micrometers up to as much as 20 nm or higher.

Optionally, the substrate comprising the dispersed magnetizable or magnetic particles may be produced in two or more phases, e.g. using a two-shot mould technique where a first part comprising the magnetizable or magnetic particles is injected first, followed by a second shot which may be without the magnetizable or magnetic particles, for instance to achieve selected properties or cost benefits.

After moulding or forming the substrate comprising the magnetizable particles, the particles are magnetized in a pattern corresponding to the pattern which is to be applied in the paint film. This can be done by using a strong permanent magnet, for example based on neodymium-iron-boron alloys, such as $Nd_{12}Fe_{14}B$, or an electro magnet. The magnet can have an outline corresponding to the desired pattern or it can be moved along a path describing the desired pattern.

The substrate can for example be made of any thermoplastic or thermocurable type of plastic, such as polyvinylchloride, polystyrene, acrylonitrile butadiene styrene (ABS), polycarbonate, polyamide, polyurethane, polyester, polytetrafluorethene, acrylic plastics, such as PMMA, polyolefins, e.g., high-density or medium-density polyethylene, polybutene, or polypropylene, etc. Suitable blends or hybrids of these plastic types may also be used if so desired. Alternatively, the substrate can be made of any other type of formable or castable material, such as ceramic materials or aluminium.

Optionally, the substrate may be coated with a primer before the effect paint with the magnetically orientable particles is applied. This is particularly suitable in the case of polyamide or polypropylene substrates.

The magnetically orientable pigments in the paint can be pigments made of a magnetic or magnetizable material. The pigments may have any suitable shape, but flakes and platelets show clearer patterns. Suitable magnetic pigments are for instance based on iron, nickel, cobalt, copper, silver, gold, chromium, gadolinium, ytterbium, dysprosium, erbium, and the like, or alloys, oxides or mixtures thereof. Ferrite flakes are particularly suitable. The flake pigments can also be multilayer pigments having at least one magnetic layer, and optionally one or more non-magnetic layers. Suitable examples are for instance mica coated with $Fe_2O_3$ or mica coated with $CoFe_2O_4$. Another suitable magnetic pigment may be, for example, mica coated with a polymer mixture containing cobalt iron oxide and a cobalt oxide. Further, suitable reflective magnetic flake pigments can be used to create markings having lustrous highlights or outlines. Alternatively, interference pigments, such as colour shifting pigments, can be used in one or more than one coating layer such that the interference pigments create markings that vary in colour and/or vary in colour intensity when viewed from different angles.

Suitable soft magnetic pigment materials can for example have a coercivity of less than about 2,000 Oe, e.g., less than about 300 Oe. Coatings comprising such soft magnetic materials are not magnetic in response to unmagnetized metals, such as steel, brass or aluminium.

The flakes can have an average particle size of, e.g., 2-60 micrometers, e.g., 10-30 micrometers. The average particle thickness of the flakes can for instance be 1-8 micrometers.

The coating composition also comprises one or more binders and a carrier. The binders are translucent after drying of the paint film. Suitable binders are for instance alkyds, polyurethanes, polyesters, latex binders such as vinylic binders, acrylates, etc. The binders can be physically drying, oxidatively drying, or they can be cured chemically, e.g., by means of a hardener component or crosslinker, or they can be curable by actinic radiation such as UV radiation.

The paint to be used in the present invention will generally be a liquid paint, e.g. a solvent borne paint. Suitable organic solvents are for instance aromatic solvents such as toluene or xylene, as well as aliphatic solvents such as ketones, glycols, e.g., ethyl diglycol, butyl glycol, butyl diglycol, or their acetates, such as ethyl glycol acetate, butyl glycol acetate, butyl diglycol acetate, and methoxypropylene glycol acetate. Commercially available solvents are for instance Shellsol® D40, an aliphatic hydrocarbon solvent available from Shell, Dowanol® PMA from Dow, and Solvesso®-150, available from ExxonMobil. Alternatively, the coating composition according to the invention can be formulated as a water borne composition, optionally comprising co-solvents or humectants, such as glycols. Inorganic enamels or coatings, such as water-glass based coatings, sol-gels, or solvent-free systems, such as hot melt paints or powder coatings, may also be used if so desired.

Although the paint film must be translucent to at least some extent, the paint may additionally comprise further magnetic or non-magnetic pigments, such as titanium dioxide, zinc oxide, leaded zinc oxide, titanium calcium, carbon black, yellow oxides, brown oxides, tan oxides, raw and burnt sienna or umber, chromium oxide green, phthalocyanine green, phthalonitrile blue, ultramarine blue, cadmium pigments or chromium pigments or any mixture thereof. Fluorescent pigments, pearlescent pigments, dichroic pigments or other special effect pigments can also be used to obtain specific special effects. Filler pigments may be added, such as clay, silica, talc, woolastonite, wood flour, and the like.

The paint film can be applied in any suitable film thickness. Suitably, the film thickness can be up to about 50 micrometers, e.g. 20 micrometers. If a base coat/clear coat system is used, the base coat can for example have a layer thickness of about 8-15 microns and the clear coat can for example have a thickness of about 20-30 microns. If a clear coat is used, it can be applied on the wet or the flash dried base coat and be cured simultaneously. Alternatively, it can be applied on the solidified base coat layer. Suitable clear coats can for example be based on an isocyanate-polyol curing system. Monocoat systems are also possible.

If so desired, the paint may be applied on a pre-coated substrate. The substrate can be pre-coated with a primer or a coloured opaque or translucent paint layer. Special effects can be obtained if the magnetizable paint layer is applied on an earlier applied film of a similar paint with a magnetized pattern. Application on substrates pre-coated with effect paints, such as pearlescent, metallic or fluorescent paints, will also give very special effects.

The effect paint is suitable for decorating virtually any type of plastic product, e.g., car parts, electrical or household appliances, mobile telephones, skis, moped helmets, plastic or glass bottle or tube packaging, computer casings, walkmen, book covers, etc.

The paint can be applied in any suitable manner. A suitable application method is for instance spray application.

The invention claimed is:

1. A method for applying a pattern onto a plastic substrate, the method including the following steps: applying a layer of a paint comprising one or more binders and magnetically orientable pigments on the substrate; exposing the paint to a magnetic field, whereby the pigments are oriented along field lines of the magnetic field to produce a pattern in the paint layer; and solidifying the paint on the substrate; wherein the magnetic field is generated by a magnetic part embedded in the plastic substrate to be coated, wherein the embedded magnetic part is formed by magnetic particles distributed in the plastic substrate which are magnetized to generate the magnetic field.

2. The method according to claim 1, further including, after solidification of the paint layer, de-magnetizing the magnetic part embedded in the substrate.

3. The method according to claim 2, wherein the substrate is first coated with a primer.

4. The method according to claim 1, wherein the substrate is first coated with a primer.

5. The method according to claim 1, further including, after solidification of the paint layer, de-magnetizing the magnetic part embedded in the substrate.

6. The method according to claim 5, wherein the substrate is first coated with a primer.

7. The method according to claim 1, wherein the substrate is first coated with a primer.

* * * * *

UNITED STATES PATENT AND TRADEMARK OFFICE

CERTIFICATE OF CORRECTION

PATENT NO. : 8,354,145 B2
APPLICATION NO. : 12/293507
DATED : January 15, 2013
INVENTOR(S) : De Rydt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this
First Day of September, 2015

Michelle K. Lee
*Director of the United States Patent and Trademark Office*